United States Patent [19]
Hosseini

[11] Patent Number: 5,769,569
[45] Date of Patent: Jun. 23, 1998

[54] IN-SITU THERMAL DESORPTION OF HEAVY HYDROCARBONS IN VADOSE ZONE

[75] Inventor: Masood S. Hosseini, Moorpark, Calif.

[73] Assignee: Southern California Gas Company, Los Angeles, Calif.

[21] Appl. No.: 665,418

[22] Filed: Jun. 18, 1996

[51] Int. Cl.$^6$ .............................. B09C 1/06; E21B 36/02
[52] U.S. Cl. ............................ 405/128; 166/50; 166/52; 166/59; 166/370; 405/131
[58] Field of Search ............................... 166/50, 52, 302, 166/369, 370, 57, 59; 405/128, 131, 258

[56] References Cited

U.S. PATENT DOCUMENTS

| | | | |
|---|---|---|---|
| 4,376,598 | 3/1983 | Brouns et al. | 405/258 |
| 4,435,292 | 3/1984 | Kirk et al. | 210/747 |
| 4,574,884 | 3/1986 | Schmidt | 166/50 X |
| 4,593,760 | 6/1986 | Visser et al. | 166/267 |
| 4,660,639 | 4/1987 | Visser et al. | 166/267 |
| 4,670,634 | 6/1987 | Bridges et al. | 219/10.41 |
| 4,842,448 | 6/1989 | Koerner et al. | 405/258 |
| 4,984,594 | 1/1991 | Vinegar et al. | 134/21 |
| 5,011,329 | 4/1991 | Nelson et al. | 405/128 |
| 5,032,042 | 7/1991 | Schuring et al. | 405/258 |
| 5,076,727 | 12/1991 | Johnson et al. | 405/128 |
| 5,114,497 | 5/1992 | Johnson et al. | 134/21 |
| 5,169,263 | 12/1992 | Johnson et al. | 405/128 |
| 5,190,405 | 3/1993 | Vinegar et al. | 405/128 |
| 5,193,934 | 3/1993 | Johnson et al. | 405/128 |
| 5,213,445 | 5/1993 | Ikenberry et al. | 405/131 X |
| 5,261,765 | 11/1993 | Nelson | 405/128 |
| 5,271,693 | 12/1993 | Johnson et al. | 405/128 |
| 5,340,236 | 8/1994 | Ikenberry | 405/131 X |
| 5,360,067 | 11/1994 | Meo, III | 405/131 X |
| 5,584,605 | 12/1996 | Beard et al. | 166/50 X |

*Primary Examiner*—George A. Suchfield
*Attorney, Agent, or Firm*—Lyon & Lyon LLP

[57] ABSTRACT

An in-situ thermal desorption system and process is utilized for mobilization and removal of nonvolatile and semi-volatile hydrocarbons from contaminated soil in the vadose zone. Persistent hydrocarbons are thermally desorbed by direct heating of the contaminated zone through combustion of fuel and air in a burner underneath the contaminated soil zone. The generated soil vapors are collected and treated by soil vapor extraction techniques.

15 Claims, 3 Drawing Sheets

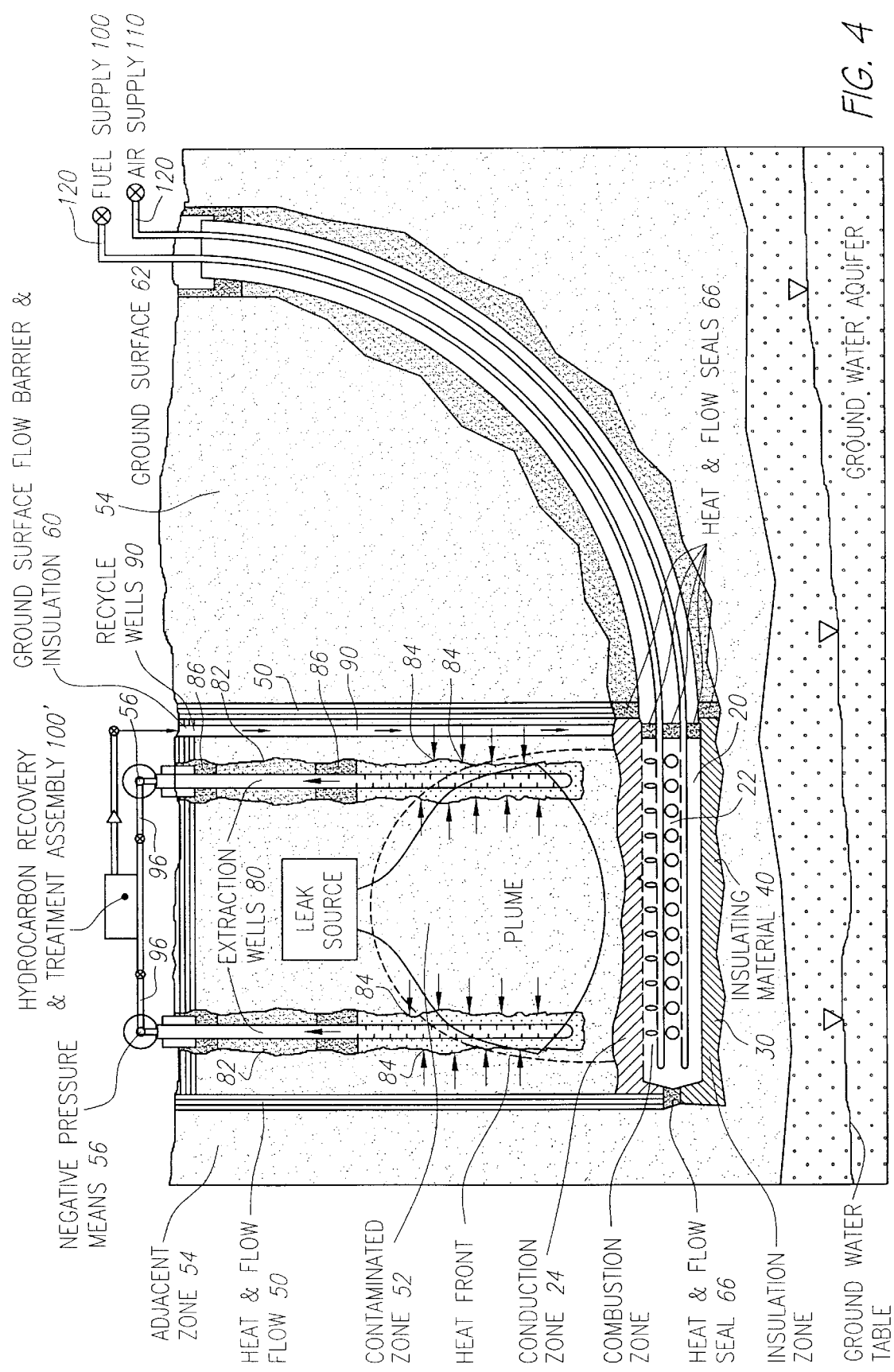

5,769,569

IN-SITU THERMAL DESORPTION OF HEAVY HYDROCARBONS IN VADOSE ZONE

FIELD OF THE INVENTION

This invention is directed to an improved in-situ method for the remediation of subsurface soil containing nonvolatile and semi-volatile heavy hydrocarbons. This invention is more particularly directed to removal of contaminants in the vadose (unsaturated) zone by thermal desorption.

BACKGROUND OF THE INVENTION

The quality of the environment continues to be of special concerns to the public. This heightened public concern is driven, in a large part, by the realization that many substances can lend to adverse environmental health conditions.

Petrochemical spills and leakages into the earth due to defective containers or pipelines is one such environmental concern and has received extensive attention. The hydrocarbons (whether in the form of oil, gas or fuel) which contaminate the soil have the significant potential to pollute the groundwater supplies. Accordingly, a variety of techniques have been discussed in the prior art for remediation of soil containing such contaminants.

In choosing a soil remediation technology, two aspects of the contaminated site must be considered. First, the physical/chemical properties of the contaminant, and second, the nature of the contaminated soil. Thus, if the contaminants are reasonably mobile and difficult to degrade (e.g., chlorinated solvents), and the soil is reasonably permeable, then traditional soil vapor extraction (SVE) techniques, which essentially employ a vacuum (or a negative pressure gradient) in the contaminated soil, would be an effective method.

For nonvolatile and semi-volatile contaminants (e.g., heavy hydrocarbons), soil vapor extraction is not an effective technique. Alternative techniques have been considered in the prior art. Many of the proposed techniques involve the excavation of the contaminated areas and subsequent (on-site or off-site) incineration of the soil by, for example, processing the soil through a kiln at an elevated temperature. Such techniques, while effective in decontaminating the affected soil, are cost prohibitive (particularly as the extraction volume increases) and may lead to difficulties in disposal of the off-gases.

In-situ bioremediation through the use of neutralizing chemicals and solvents, as well as nutrients and microorganisms, is another employed technique which appears to be successful for limited soil types under ideal conditions.

Still more exotic in-situ techniques involve the use of radio frequency energy, surface conduction heaters or electric heater wells in combination with vapor extraction systems. For example, U.S. Pat. No. 4,670,634 discloses a method for in-situ decontamination of spills and landfills by radio frequency heating. The soil is heated by radio frequency energy to a temperature higher than that needed to boil water, which is said to increase the permeability of the region and thus permitting dielectric heating. The heating is then continued by dielectric heating after water has boiled from at least a portion of the heated region with soil temperatures reaching elevated temperatures in the range of 100° C. to 400° C. Decontamination of the heated soil is said to be achieved in a number of ways, as by pyrolysis, thermally assisted decomposition, distillation, or reaction with an introduced reagent, such as oxygen. This method has several disadvantages. The use of radio frequency power results in non-uniform heating of the soil resulting in cyclical hot and cold spots in the soil. Further, this method requires cumbersome vapor collection barriers at the surface and entail high operating expenses.

A related process is disclosed in U.S. Pat. No. 4,984,594 which is directed to an in situ method for remediation and decontamination of surface and near-surface soils by evacuating the soil under a flexible sheet, which is impermeable to gases, and heating the soil surface with a relatively flat electric surface heater, which is permeable to gases. The efficacy of this method is suspect since significant vapor flow takes place only at the surface of the heated soil or within a blanket or cover placed on the surface of the soil that it covers.

U.S. Pat. No. 5,190,405 discloses an in situ method for removal of contaminants from soil by imposing a vacuum on the soil through perforated vertical heater wells that are positioned in the soil. The vertical heater wells heat the soil to elevated temperatures by thermal conduction. An impermeable flexible sheeting on the soil surface is said to reduce the amount of air that is being pulled into the heater well from the atmosphere. Soil contaminants are removed by vaporization, in-situ thermal decomposition, oxidation, combustion, and by steam stripping.

In U.S. Pat. No. 5,076,727 moist warm air from a vapor treatment system is injected into wells which are perforated only at the contaminated depth forcing vapor flow only through the contaminated region. Between the injection wells is an extraction well which is also perforated only at the contaminated depth. A vacuum is drawn on the extraction well drawing the flushing vapors from the injection wells and toward the extraction well through the contaminated soil. The contaminated, flushing vapor is then treated and recycled. A microwave/radio frequency (MW/RF) heating system heats the earth's surface and the contaminated soil, thereby enhancing volatilization of the contaminants and their removal via the vapor finishing system.

U.S. Pat. No. 5,114,497 discloses a method of remediation comprising supplying thermal energy to the soil at one or more locations under the surface of the soil through a relatively flat and flexible heat source located between the surface of the soil and an insulative cover material. The vapors resulting from contaminant vaporization or decomposition under the influence of thermal energy are then collected under the influence of reduced pressure.

In U.S. Patent No. 5,169,263 is disclosed a similar in-situ heating process which utilizes a submerged vapor recovery system comprising perforated or slotted pipes buried in the soil below the depth of contamination. A vapor recovery/treatment system is connected to the buried pipe network and includes a method of inducing a vacuum on the buried pipe network and a treatment system for the contaminated vapor. Heat is supplied to the soil surface by a relatively flat and flexible resistance heater.

U.S. Pat. No. 5,193,934, too, discloses an in-situ desorption system which utilizes a perforated or slotted pipe buried in the soil below the depth of contamination in the soil, with a similar vapor recovery/treatment system. The source of heating comprises of fuel and compressed air fed to a pressurized combustion chamber (located on the surface of the earth) and combusted, the combustion products flow into the buried pipe and distributed through the contaminated soil. The contaminants and their by-products are swept away by the combustion products into the vapor recovery/treatment system.

Similarly, U.S. Pat. No. 5,011,329 discloses an in-situ decontamination method and apparatus for injecting hot gas into boreholes formed in a contaminated soil area to vaporize the soil mixture and contaminants, and for collecting the vaporized contaminants at the surface of the soil. A burner heats pressurized gases and mixes the same with combustion gases for injection into the contaminated zone.

While the foregoing techniques are to varying extent effective in providing in-situ decontamination of the soil, common shortcomings attendant to such techniques are that the processes entail high operating expenses (including high energy costs), require expensive equipment or chemicals or do not lead to efficient heat transfer to the contaminated soil.

From the foregoing, it can be seen that a need exists for a cost-effective technique for an improved and efficient in-situ removal of contaminants from soil. There is also a need for an efficient method for delivery of heat to the contaminated soil such that the contaminants are effectively mobilized and removed. Yet another need exists for an efficient utilization of energy, in which fuel (such as natural gas) and air (or other source of oxygen) are combusted within a chamber located beneath the contaminated zone so that the attendant heat losses in the combustion gas delivery system are minimized.

SUMMARY OF THE INVENTION

In a first aspect of the invention, an improved method and apparatus for in-situ removal of contaminants from soil is disclosed.

In another aspect of the invention, an improved method and apparatus for in-situ thermal desorption of petroleum hydrocarbons from soil is disclosed.

In yet another aspect of the invention, an improved method and apparatus for in-situ thermal desorption of petroleum hydrocarbons from soil in the unsaturated zone is described.

In another aspect of the invention, an improved method and apparatus for in-situ thermal desorption of petroleum hydrocarbons from soil in the unsaturated zone is described wherein fuel and air (or other source of oxygen supply) are combusted within a chamber located beneath the contaminated zone such that heat losses are minimized and heat energy is more efficiently delivered to the contaminated zone.

In another aspect of the invention, an improved method and apparatus for in-situ thermal desorption of petroleum bydrocarbons in the saturated zone of the contaminated soil is described wherein fuel and air (or other oxygen supply) are combusted within a chamber located beneath the contaminated zone such that heat losses are minimized heat energy is more efficiently delivered to the contaminated zone.

BRIEF DESCRIPTION OF THE DRAWINGS

FIG. 4 depicts a sectional view of another embodiment of the invention employing venting means for introduction of the recovered hydrocarbon vapor into the burner means.

DESCRIPTION OF THE PREFERRED EMBODIMENT

Figure 1:
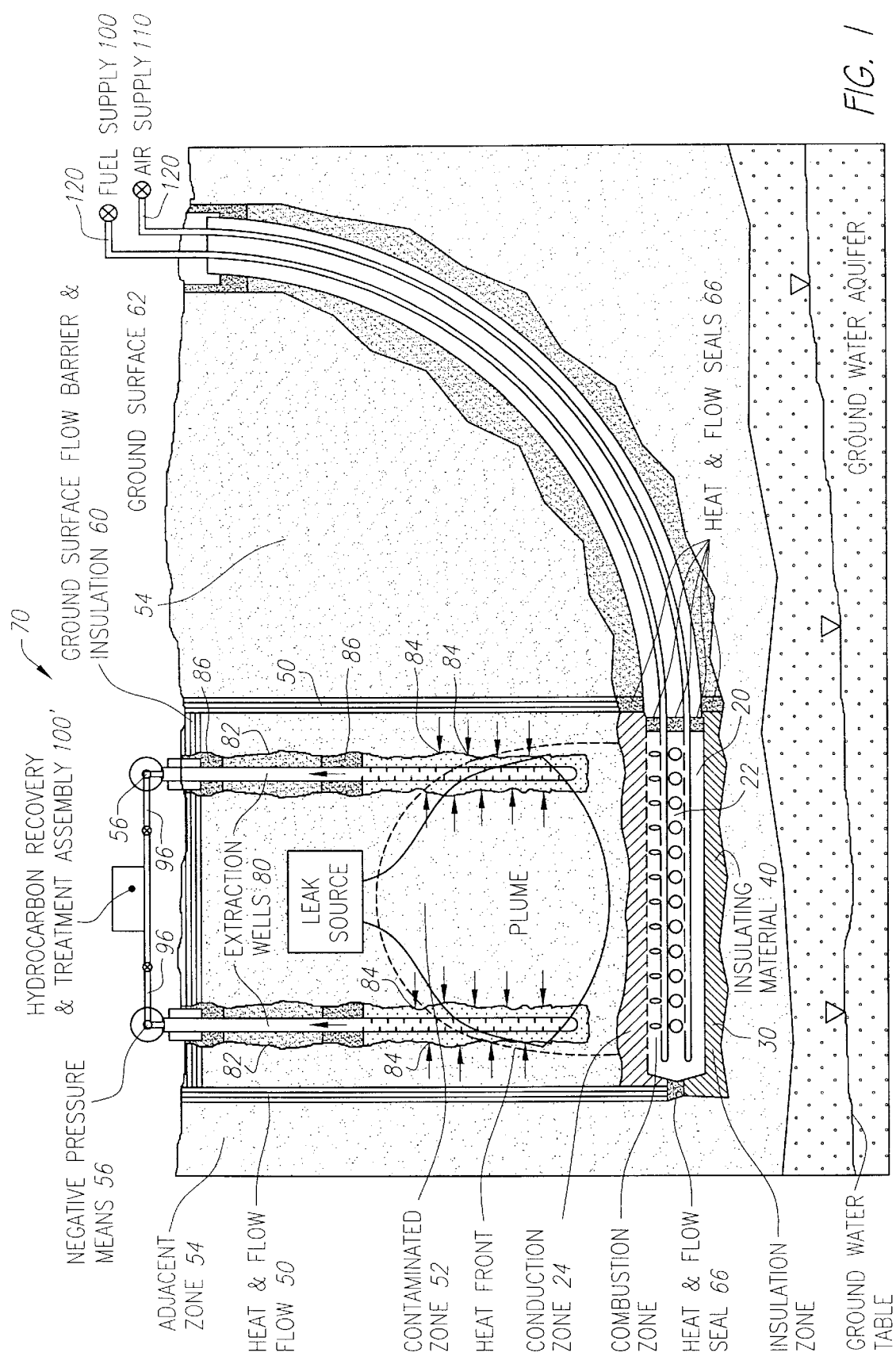
FIG. 1 depicts a sectional view of one embodiment of the invention.

FIG. 1 shows a generalized schematic of the invention. Briefly, in the disclosed apparatus and method persistent hydrocarbons are thermally desorbed from the contaminated soil zone by direct heating of the impacted or contaminated soil zone. The heat is generated by combustion of fuel (such as natural gas) with air (or other source of oxygen) within a horizontal well-casing beneath the contaminated soil zone. Traditional soil vapor extraction techniques are then utilized to collect the soil vapor generated as a result of the heating of the contaminated soil zone.

Studies with unsaturated soils at ambient temperatures (e.g., Farrell, J. and M. Reinhard, "Desorption of Halogenated Organics from Model Solids, Sediments and Soil under Unsaturated Conditions, 1 Isotherms," *Environ. Sci. Technol.*, 28(1), 53–62, 1944a and Farrell, J. and M. Reinhard, "Desorption of Halogenated Organics from Model Solids, Sediments and Soil under Unsaturated Conditions, 1 Kinetics," *Environ. Sci. Technol.*, 28(1), 63–72, 1944b), have revealed that for dry soils, physical adsorption and condensation of organic vapors can result in a large amount of contaminants associated with the solid surfaces. This contamination is, in most cases, relatively easy to mobilize, because there is not enough water present to form a significant barrier to diffusive mass transfer of the contaminants from the soil particles. However, even when a small amount of water is present in the soil, it will cover the soil particles' surfaces and thus substantially reduce the amount of desorption (through mass transfer) of the organic contaminant. This is because the presence of water can also greatly increase the mass transfer resistances affecting the desorption rate of the contaminants. Thus, in an in-situ process, the drying of the contaminated porous earth medium is a critical factor. And that is precisely what an aspect of this invention is directed to.

The apparatus of the claimed invention is schematically depicted in FIG. 1. The basic components of this invention are: (1) a horizontal well-casing 20 containing a combustion burner means 22 which is insulated on its underside 30 by an insulating layer 40; (2) lateral flow barriers 50 which enclose the contaminated zone 52 and which prevent the lateral flow of heat as well as flow of the mobilized contaminants (i.e., hydrocarbons) and the vaporized water from the contaminated zone 52; (3) an earth surface flow barrier 60 which prevents air flow into the contaminated zone 52 from the atmosphere 70 through the earth surface 62 and also serves to minimize heat loss from the earth surface 62 to the surrounding environment 70; (4) extraction wells 80; (5) hydrocarbon recovery and treatment assembly 100'; and (6) natural gas or other fuel (e.g., propane) supply 100 and air or other oxygen supply 110 connected by lines 120 and 120' to the burner 22.

As for the horizontal well-casing 20, the exterior region around it which underlies the contaminated zone 52 is packed with a granular material 24 such as bauxite that is a good heat conductor. Air (or oxygen) and fuel lines 120 and 120' are plumbed to the horizontal well-casing 20 and connect to the burner means 22. The burner means 22 preferably extends throughout the entire length of the well-casing 20 so that heat is evenly and uniformly distributed to the overlying contaminated zone 52. The fuel and air may be ignited by a remote control electrical lighter or gas ignitor/lighter switch (not shown), for example. Depending on the particular burner means 22 design, temperatures ranging from 300° to 900° C. may be generated within the well-casing 20 so as to develop a sufficient heat flux into the contaminated zone 52 overlying the well-casing 20, causing the hydrocarbon contaminants to be mobilized.

The lateral flow barriers 50 are installed into the earth to a depth near the depth at which the well-casing 20 is placed such that the contaminated zone 52 is preferably fully enclosed by the lateral flow barriers 50, the horizontal well-casing 20 and the earth surface flow barrier 60. To minimize the heat and mobilized hydrocarbon flow from the gap between the flow barriers 50 and the horizontal well-casing 20, heat and flow seals 66 may be employed to achieve a seal between those components. The flow barriers 50 may be prefabricated in one or several pieces and then installed into channels dug into the earth and configured to receive the flow barriers 50. Alternatively, the flow barriers 50 may be built in place as the earth is dug. The dimension and configuration of the flow barriers 50 may vary depending on the extent and configuration of the contaminated zone 52. In other words, the flow barriers 50 is suitably dimensioned so that, together with the earth surface flow barrier 60 and the horizontal well-casing 20, they substantially enclose the contaminated zone 52.

Further, the lateral flow barriers 50 are preferably impermeable so as to prevent water vapor or other gaseous products present in adjacent (uncontaminated) zone 54 from entering the contaminated zone 52 or flowing into the extraction wells 80. The lateral flow barriers 50 also serve to prevent the flow of mobilized contaminants from the contaminated zone 52 into the adjacent zone 54. The lateral flow barriers 50 also serve to insulate the contaminated zone 52 such that heat losses from the contaminated zone 52 to the uncontaminated adjacent zone 54 are minimized.

Extraction wells 80 comprise of well-casings 82 which preferably have perforations 84 only in their lower portion which are located in the contaminated zone 52.

The portions of the extraction wells 80 that are not in the contaminated zone 52 preferably have no perforations, thus increasing contaminant vapor extraction efficiency. The higher portion and lower (perforated) portion of the extraction wells preferably cooperate by sealing means 86.

Extraction wells 80 are attached to vacuum means 56 such as an air pump or vacuum pump that provides sufficient negative pressure to impact the entire contaminated zone 52 such that mobilized contaminants are pulled into the extraction wells 80. Sealing means 86' may be used to ensure appropriate sealing of the connection between the extraction wells 80 and the vacuum means 56.

Figure 2:
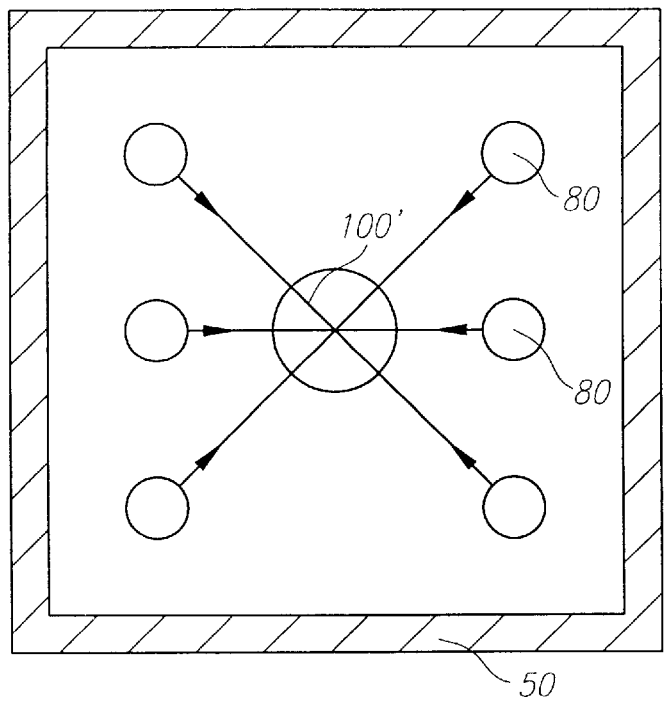
FIG. 2 depicts a plan view from the surface of the soil of one embodiment of the invention showing the vapor extraction means layout as connected to the hydrocarbon recovery and treatment assembly.
Figure 3:
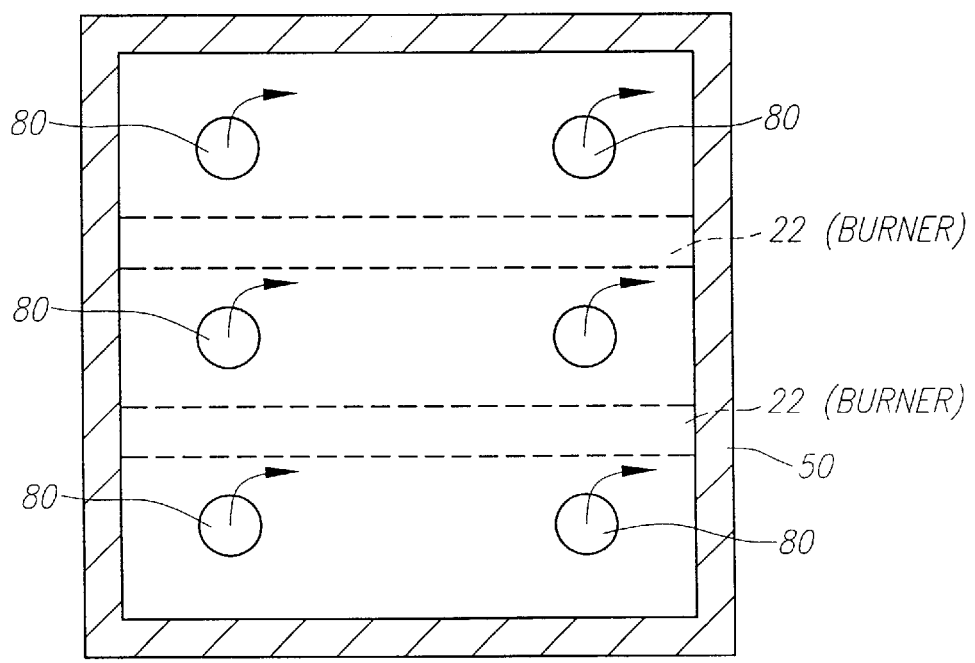
FIG. 3 depicts a plan view from the surface of the soil of another embodiment of the invention employing a plurality of burner means and a plurality of vapor extraction means.

FIG. 2 depicts a view from the surface of the soil of one embodiment of the invention showing the extraction wells 80. Depending on the size and extent of the contaminated zone 52, a plurality of extraction wells 80 may be employed to achieve the desired removal of the mobilized contaminant vapors from the contaminated zone 52. FIG. 3 depicts a view from the surface of the soil of another embodiment of the invention employing a plurality of extraction wells 80 which are suitably spaced apart to impact substantially the entire contaminated zone 52 as well as a plurality of burner means 22 which may be placed underground in the contaminated zone 52.

Extraction wells 80 are connected through connecting lines 96 to a hydrocarbon recovery and treatment assembly 100'. The hydrocarbon recovery and treatment assembly 100' separates the hydrocarbons from the mobilized and extracted vapor stream. The connecting lines 96 may be placed underground near the earth surface 62 or may be placed above the earth surface 62. The hydrocarbon recovery and treatment assembly 100' as well as the connecting lines 96 may be heat insulated to prevent heat loss to the atmosphere 70.

In another embodiment of the invention, as seen in FIG. 4, a plurality of recycle wells 90 may be employed. The venting wells 90 may be connected to the hydrocarbon recovery and treatment assembly 100' and serve to return the treated hydrocarbon vapor stream from the hydrocarbon recovery and treatment assembly 100' to the burner means 22. In this way, the extracted hydrocarbons contaminants may be used as a source of fuel for further heating and mobilization of the contaminants in the contaminated zone 52, and accordingly, result in lower fuel costs.

The surface flow barrier 60 seals the earth surface 62 of the contaminated zone 52 and preferably comprises of an impermeable, insulating material to prevent heat loss and the escape of vapor phase contaminants from the contaminated zone 52 to the surrounding atmosphere 70. It also helps reduce the flow of atmospheric air 70 into the contaminated zone 52 by the action of the negative pressure induced in the contaminated zone 52 by the vacuum means 56.

It is clear from the foregoing disclosure that while a particular form of the invention has been illustrated and described, various modifications may be made without departing from the spirit and scope of the invention. Accordingly, it is not intended that the invention be limited to the foregoing disclosure except as by the appended claims.

What is claimed:

1. An apparatus for removing contaminants from unsaturated contaminated soils located above the water table by thermal desorption, comprising;

heating means comprising a horizontal well-casing located below the unsaturated contaminated soil, a natural gas line and an oxygen line which run along the entire length of said horizontal well-casing and when ignited combust throughout the entire length of the horizontal well-casing;

vapor impermeable insulation means placed on the surface of the contaminated soil;

one or more vacuum extraction wells comprising a well-casings having a perforate lower portion located in the contaminated unsaturated soil and above the water table, acting in cooperation with pressure reducing means connected to said well casing, for collecting at reduced pressure the vapors generated by said heating means;

insulation means for insulating the underside of said horizontal well-casing;

contaminant separation means connected to said pressure reducing means for removing from said collected vapors the undesirable contaminants; and one or more recycle wells comprising a well casing having a perforate lower portion located in the contaminated unsaturated soil and above the water table, acting in cooperation with said pressure reducing means and contaminant separation means, for recirculating decontaminated vapors from said separation means to the contaminated soil.

2. An apparatus for removing contaminants from unsaturated contaminated soils located above the water table by thermal desorption, comprising;

heating means comprising a horizontal well-casing located below the unsaturated contaminated soil, a natural gas line and an oxygen line which run along the entire length of said horizontal well-casing and when ignited combust throughout the entire length of the horizontal well-casing;

vapor impermeable insulation means placed on the surface of the contaminated soil;

one or more vacuum extraction wells comprising a well casing having a perforate lower portion located in the contaminated unsaturated soil and above the water table, acting in cooperation with pressure reducing means connected to said well casing, for collecting at reduced pressure the vapors generated by said heating means;

insulation means for insulating the underside of said horizontal well-casing; and contaminant separation means connected to said pressure reducing means for removing from said collected vapors the undesirable contaminants.

3. The apparatus of claim 2 wherein said contaminants are heavy hydrocarbons.

4. The apparatus of claim 2 wherein said contaminant separation means is heat insulated.

5. The apparatus of claim 1 wherein said contaminant separation means is heat insulated and is connected by heat insulated means to said extraction wells and said recycle wells.

6. The apparatus of claim 2 wherein said natural gas line is connected to a natural gas supply located above the earth surface.

7. The apparatus of claim 2 wherein said oxygen line is connected to an oxygen supply located above the earth surface.

8. The apparatus of claim 2 wherein the exterior upper region of the horizontal well-casing which underlies the unsaturated contaminated soil is packed throughout the entire length of the horizontal well-casing with a conducting material.

9. A method for removing contaminants from unsaturated contaminated soils located above the water table by thermal desorption, comprising:

burying a heating means below said contaminated soil and essentially parallel to the surface thereof, said heating means comprising a horizontal well-casing insulated on its underside;

transferring natural gas from a source of natural gas and oxygen from a source of oxygen located above the earth surface by connecting lines to said horizontal well-casing, said oxygen and natural gas connecting lines running within the entire length of said horizontal well-casing, mixing and igniting said natural gas and oxygen within said horizontal well-casing generating heat to be generated within said horizontal well-casing whereby said contaminated soil above said horizontal well-casing is heated to generate vapors;

placing a vacuum extraction well comprising a well-casing having perforate lower portion in the contaminated unsaturated soil and above the water table, said vacuum extraction well acting in cooperation with pressure reducing means connected to said well casing, for collecting at reduced pressure said collected vapors generated by said heating means;

separating undesirable contaminants from said collected vapors generated by said heating means.

10. The apparatus of claim 2 wherein said contaminant separation means is heat insulated and is connected by heat insulated means to said extraction wells.

11. The apparatus of claim 1 wherein said contaminants are heavy hydrocarbons.

12. The apparatus of claim 1 wherein said contaminant separation means is heat insulated.

13. The apparatus of claim 1 wherein said natural gas line is connected to a natural gas supply located above the earth surface.

14. The apparatus of claim 1 wherein said oxygen line is connected to an oxygen supply located above the earth surface.

15. The apparatus of claim 1 wherein the exterior upper region of the horizontal well-casing which underlies the unsaturated contaminated soil is packed throughout the entire length of the horizontal well-casing with a conducting material.

* * * * *